(12) United States Patent
Alsharaeh et al.

(10) Patent No.: US 8,557,916 B1
(45) Date of Patent: Oct. 15, 2013

(54) COMPOSITION AND METHOD OF MAKING NANOCOMPOSITE CONTAINING GRAPHENE SHEETS

(71) Applicants: Edreese H Alsharaeh, Riyadh (SA); Mohammad AlDosari, Riyadh (SA); Ali Abdel-Rahman Mohammad Othman, Riyadh (SA)

(72) Inventors: Edreese H Alsharaeh, Riyadh (SA); Mohammad AlDosari, Riyadh (SA); Ali Abdel-Rahman Mohammad Othman, Riyadh (SA)

(73) Assignee: Alfaisal University, Riyadh (SA)

( * ) Notice: Subject to any disclaimer, the term of this patent is extended or adjusted under 35 U.S.C. 154(b) by 0 days.

(21) Appl. No.: 13/873,329

(22) Filed: Apr. 30, 2013

(51) Int. Cl.
*C08F 292/00* (2006.01)

(52) U.S. Cl.
USPC .......................................... 524/700; 524/495

(58) Field of Classification Search
USPC .................................................. 524/495, 700
See application file for complete search history.

(56) References Cited

PUBLICATIONS

Hummers et al (Preparation of graphitic oxide, JACS 80 (1958) 1339).*
Hu et al (Preparation and properties of graphene nanosheets polystyrene nanocomposites via in situ emulsion polymerization, Chemical physics letters, 484 (2010) 247-253).*
Wang et al (Preparation and mechanical and electrical properties of graphene nanosheets-poly(methyl methacrylate) nanocomposites via in situ suspension polymerization, J of Applied polymer science, vol. 122, 1866 (2011)).*
Pasupuleti et.al. Ultrasonic degradation of poly(styrene-co-alkyl methacrylate) copolymers, Ultrasonics Sonochemistry 17 (2010) 819-826.
Stankovich et. al., Synthesis of graphene-based nanosheets via chemical reduction of exfoliated graphite oxide, Carbon 45 (2007) 1558-1565.
Matusinovic et al., Synthesis and characterization of poly(styrene-co-methyl methacrylate)/layered double hydroxide nanocomposites via in situ polymerizatioN, Polym Degrad Stab 94(1):7 (2009).
Kuilla et. al., Recent advances in graphene based polymer composites, Progress in Polymer Science , vol. 35 (11) Elsevier—Nov. 1, 2010, 1350-1375.
Paul et. al., Polymer nanotechnology: Nanocomposites, vol. 49, Issue 15, Jul. 7, 2008, pp. 3187-3204.
Hassan et. al.,Mocrowave synthesis of graphene sheets suporting metal nanocrystals in aqueous and organic media, Journal of Materials Chemistry, 19, 3832-3837, 2009.
Potts et. al., Graphene-based polymer nanocomposites, Polymer 5-25 (2011).
Huang et al., Graphene-Based Materials: Synthesis, Characterization, Properties, and Applications, SMA 7, No. 14, 1876-1902, 2011.
Ramanathan et.al., Functionalized graphene sheets for polymer nanocomposites, Nature Nanotechnology, vol. 3, 327-331, Jun. 2008.
Park et. al., Chemical Methods for the production of graphenes, Nature Nanotechnology published online 2009.

\* cited by examiner

*Primary Examiner* — Ling Choi
*Assistant Examiner* — Wenwen Cai
(74) *Attorney, Agent, or Firm* — Geeta Kadambi; Riddhi IP LLC

(57) ABSTRACT

A dual approach with slight modification was used to produce a nanocomposite using graphene sheets. The nanocomposite may be used for medical devices such as bone cement, dentures, paper, paint and automotive industries. A novel Microwave irradiation (MWI) was used to obtain R-(GO-(STY-co-MMA)). The results indicate that the nanocomposite obtained using the MWI had a better morphology and dispersion with enhanced thermal stability compared with the nanocomposite prepared without MWI. An average increase of 136% in hardness and 76% in elastic modulus were achieved through the addition of only 2.0 wt % of RGO nanocomposite obtained via the MWI method.

11 Claims, 14 Drawing Sheets

COMPOSITION AND METHOD OF MAKING NANOCOMPOSITE CONTAINING GRAPHENE SHEETS

FIELD OF TECHNOLOGY

The present disclosure relates to a novel composition and method of making the novel composition for a nanocomposite containing graphene sheets.

BACKGROUND

Graphene (GR) is known as the thinnest two-dimensional graphitic carbon ($sp^2$-bonded carbon sheet) material and is one atom in thickness [Hassan et. al. 2009, Huang et al. 2011, Kuilla et al. 2010]. GR has recently attracted much interest as filler for the development of new nanocomposite. Its extraordinary structural, mechanical, thermal, optical and electrical properties make GR an excellent two-dimensional filler material for polymer composite for application in many technological fields.

However, one of many challenges is achieving good dispersion of the nanoscale filler GR, which has a strong tendency to agglomerate due to intrinsic van der Waals forces, in the composite. Good dispersion is crucial for achieving the desired enhancement in the final physical and chemical properties of the composite. There is a need to find an optimal method to create a nanocomposite that has superior physical and chemical properties and is easy to make.

SUMMARY

The present disclosure describes a composition, method for a new nanocomposite and its use for various industrial uses. In one embodiment, a composition for a nanocomposite having graphene sheet is described. In another embodiment, a method of making a nanocomposite with graphene sheet is described.

The nanocomposite, in one embodiment, is made by using microwave irradiation (MWI). In another embodiment, the nanocomposite comprises of graphene, styrene and methyl methacrylate. In one embodiment, the nanocomposite is used for medical devices such as bone cement, dentures, paper, paint and automotive industries. In another embodiment, the nanocomposite has a superior nanomechanical properties compared to non MWI method of preparation.

In one embodiment, a method of making nanocomposite is by synthesizing reduced graphene oxide powder. In another embodiment, styrene and methyl methacrylate is mixed in a specific weight ratio. The ratio is 1:1. In another embodiment, specific time and specific temperatures are used for performing various steps to obtain a copolymer of ST-co-MMA polymer with graphene sheets that is called a nanocomposite in the instant invention.

The composition of the nanocomposite and method of making and using the nanocomposite disclosed herein may be implemented in any means for achieving various aspects, and may be executed to be used for various industrial applications including medical and non-medical applications. Other features will be apparent from the accompanying drawings and from the detailed description that follows.

Figure 1:
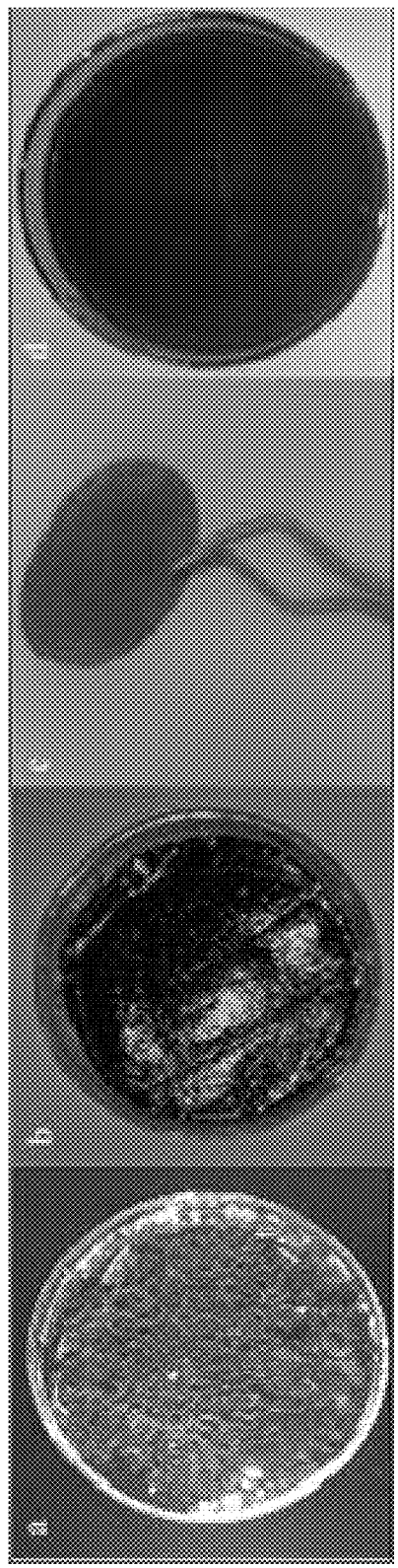
FIG. 1. Digital camera photograph of (a) neat poly(STY-co-MMA), (b) and (c) RGO-(STY-co-MMA) nanocomposite, (d) R-(GO-(STY-co-MMA)) nanocomposite. Powders obtained after solvent evaporation and drying the samples at room temperature FIG. 2. FTIR spectra of (a) GO, (b) GR, (c) neat poly(STY-co-MMA), (d) RGO-(STY-co-MMA) nanocomposite, (e) R-(GO-(STY-co-MMA)) nanocomposite FIG. 3. $^1$H NMR spectra of (a) neat poly(STY-co-MMA), (b) RGO-(STY-co-MMA) nanocomposite, (c) R-(GO-(STY-co-MMA)) nanocomposite/using $CDCl_3$ solvent FIG. 4. $^{13}$C NMR spectra of (a) neat poly(STY-co-MMA), (b) RGO-(STY-co-MMA) nanocomposite, (c) R-(GO-(STY-co-MMA)) nanocomposite/using $CDCl_3$ solvent FIG. 5. The Raman spectra of (a) GO, (b) GR (c) neat poly(STY-co-MMA), (d) RGO-(STY-co-MMA) nanocomposite FIG. 6. XRD patterns of (a) graphite, (b) GO, (c) GR, (d) neat poly(STY-co-MMA), (e) RGO-(STY-co-MMA) nanocomposite, (f) R-(GO-(STY-co-MMA)) nanocomposite FIG. 7. The SEM micrographs of (a) Graphite, (b) GO, (c) GR, (d) neat poly(STY-co-MMA), (e) RGO-(STY-co-MMA) nanocomposite, (f) R-(GO-(STY-co-MMA)) nanocomposite FIG. 8. The HR-TEM images of (a) graphene (GR), (b) neat poly(STY-co-MMA), (c) RGO-(STY-co-MMA) nanocomposite, and (d) R-(GO-(STY-co-MMA)) nanocomposite FIG. 9. TGA thermograms of neat copolymer, in situ RGO-copolymer nanocomposite, and MWI RGO-copolymer nanocomposite.

Other features of the present embodiments will be apparent from the accompanying drawings and from the detailed description that follows.

DETAILED DESCRIPTION

In the instant invention the preparation of the nanocomposite (using in situ and microwave method), characterization and evaluation of the chemical, structural properties, thermal behavior and intercalation and/or exfoliation, dispersion of graphene (GR) sheet is described.

The description describes the materials and method of making the nanocomposite as well as other means of making the composite to be compared with the instant invention.

One of the advantages of graphene or graphene oxide (GO) is that it can be well-dispersed in water and physiological environments because of its abundant hydrophilic groups, such as hydroxyl, epoxide and carboxylic groups, on its surfaces. Graphene has recently attracted interest from researchers as a filler material in new composite polymers. The structural, mechanical, thermal, optical and electrical properties of graphene make it an excellent two-dimensional filler material for polymer composite that may find applications in numerous technological fields.

Various techniques have been developed for the synthesis of such composite structures, including solution mixing, melt blending, in situ polymerization and in situ polymerization using microwave irradiation (MWI). The MWI method offers a fast and easy way to synthesize graphene-based materials. In MWI, dielectric heating energy is transferred directly to the reactants. Energy is supplied to the molecules faster than they are able to relax, which creates high instantaneous temperatures and increases the yield and quality of the products. The co-polymer of methyl methacrylate and styrene (MMA-co-STY) is an important polymeric material that has numerous applications in medicine (e.g., as bone cement), dentistry (e.g., dentures) and the paper, paint and automotive industries.

In the instant invention we present our characterization of nanocomposite material that contain co-polymers (STY-co-MMA) with graphene sheets.

Experimental Section—Materials:

Extra pure graphite powder (>99.5%) was purchased from Merck (Germany), and hydrazine hydrate (HH, 80%) was obtained from Loba Chemi. Pvt. Ltd (India). Styrene (STY) and Methyl methacrylate (MMA) monomers (Acros Chemical Co., UK, 99%) were kept in a refrigerator and used as received. Benzoyl peroxide (BP) (BDH Chemicals Ltd., UK) was used as an initiator. Potassium permanganate ($KMNO_4$, >99%) and hydrogen peroxide ($H_2O_2$, 30%) were obtained from Merck (Germany). Other solvents and chemicals were of analytical grade and used without further purification.

Preparation of GR Oxide (GO):

GO was synthesized from the oxidation of graphite powder via the Hummers and Offeman method. Natural graphite (3.5 g) was added to 100 ml of 98% $H_2SO_4$ under vigorous stirring. $KMNO_4$ (10 g) was slowly added, and the temperature was maintained below 20° C. The stirring was continued for 1 h or 2 h at 35° C. Then, the content of the flask was poured into 500 ml of deionized water, and a sufficient amount of $H_2O_2$ (20 ml of a 30% aqueous solution) was added to destroy any excess permanganate. Upon treatment with the peroxide, the suspension turned bright yellow. GO was isolated by filtration through a sintered glass filter. The product was thoroughly washed with dilute HCl and then hot water to remove the residual sulfate ions yielding a yellow-brown filter cake. After repeated washing of the resulting yellowish-brown cake with hot water, the GO was dried at 80° C.

Preparation of Reduced GO (RGO):

The dried GO (400 mg) was stirred and sonicated in 20 ml of deionized water until a homogeneous yellow dispersion was obtained. The GO can be dispersed easily in water due to the presence of a variety of hydrophilic oxygen groups (OH, O and COOH) on the basal planes and edges. The solution was placed inside a conventional microwave after the addition of 400 µl of the HH reducing agent. The microwave oven (KenWood MW740) was operated at full power (900 W) in 30 s cycles (on for 10 s and off and stirring for 20 s) for a total reaction time of 2 min. The yellow dispersion of GO gradually changed to a black color indicating the completion of the chemical reduction to GR. The GR sheets were separated using a centrifuge (Centurion Scientific Ltd.) operated at 5000 rpm for 15 min and dried at 80° C. overnight.

In Situ Preparation of RGO-(STY-co-MMA) Composite:

RGO powder (2.0 (wt./wt. %)) was added to the STY and MMA (1:1 wt %) mixture, stirred and sonicated for 1 hr. Soon after the BP initiator (5.0 wt %) was added to the suspension and stirred until the initiator was dissolved. And then the mixture was heated and maintained at 60° C. for 20 h to promote polymerization using shaking-water bath (GFL). After the polymerization was complete, the product was poured into an excess of methanol, stirred for 15 minutes, and washed with hot water; it was the filtered and dried in an oven at 80° C. overnight.

Preparation of R-(GO-(STY-co-MMA)) Nanocomposite by MWI:

GO powder (2.0 (wt./wt. %)) was added to the STY and MMA (1:1 wt %) mixture, stirred and sonicated for 1 hr. Then BP initiator (5.0 wt. %) was added to the suspension and stirred until the initiator dissolved. Then, the reaction mixture was maintained at 60° C. for 20 h to promote polymerization using a shaking-water bath (GFL). After the polymerization finished, the product was poured into an excess of methanol, stirred for 15 min and washed with hot water. Then, the product was filtered and dried at 80° C. overnight. Four hundred milligrams of the dried composite of GO-polymers were dissolved in solvent, stirred and sonicated for 1 h. Then, the composite was placed inside a conventional microwave oven (Kenwood MW740) following the addition of 400 µl of HH. The microwave oven was operated at full power (900 W) in 30 s cycles (on for 10 s and off and stirring for 20 s) for a total reaction time of 2 min. Then, the composite were separated using a centrifuge (Centurion Scientific Ltd.) operated at 5000 rpm for 15 min and dried in an oven at 80° C. overnight. For comparison, the neat poly (STY-co-MMA) was prepared via a similar procedure in the absence of the RGO and GO.

Instrumentation and Characterization:

The FTIR (Thermo Scientific Nicolet-iS 10) spectra of the nanocomposite were recorded in the range of 4000-500 $cm^{-1}$. The $^1H$ NMR of the solution was recorded on a Bruker Avance (III) at 400 MHz using $CDCl_3$ as the solvent, and the nanocomposite were macerated in a solvent for 1 day. The Raman spectra of nanocomposite were measured with a Bruker Equinox 55 FT-IR spectrometer equipped with an FRA106/S FT-Raman module and a liquid $N_2$-cooled Ge detector using the 1064 nm line of a Nd:YAG laser with an output laser power of 200 mW. The X-ray diffraction (Philips-Holland, PW 1729) of the nanocomposite were investigated with Cu radiation (30 kV, 40 mA, Kα radiation ($\lambda=1.54430$ Å)) between 2θ of 5° and 100°. The thermogravimetric analyses (TGA) of the nanocomposite were studied using a NETZCH 209 F1 thermogravimetric analyzer. The decomposition temperature measurements using TGA were performed under an $N_2$ atmosphere at a heating rate of 10° C. per minute from 25° C. to 800° C. Differential scanning calorimetry (DSC, NETZCH 204 F1) measurements were employed to estimate the glass-transition temperature ($T_g$) of each nanocomposite. The nanocomposite were heated from −25° C. to 100° C. at a heating rate of 10° C. per min. Then, a double run was performed after cooling at a heating rate of 2° C. per min from 25° C. to 350° C. The $T_g$ was taken as the midpoint of the transition. A scanning electron microscope (SEM, FEI Quanta 200) was employed to study the morphology of the nanocomposite after they were mounted on the nanocomposite slabs and coated with gold via sputtering system (Polaron E6100, Bio-Rad). Ultrathin sections of the composite were prepared for high resolution transmission electron microscopy (HR-TEM) studies; the high resolution transmission electron microscope (JEOL JSM-2100F, JEOL) was operated at 200 kV. A drop of the composite dispersed in ethanol was placed on copper grids and dried for studies.

Results and Discussion

Copolymers and Graphene-Copolymers Composite by In Situ and MWI:

Following the procedure of in situ and MWI reduction methods, the solvent can be dried and the RGO-(STY-co-MMA) composite can be recovered in the film form, and a powder form for R-(GO-(STY-co-MMA)) composite. These composite are different from pristine graphene and neat copolymer.

FIG. 1 shows the dried samples of poly (STY-co-MMA), RGO-(STY-co-MMA) and R-(GO-(STY-co-MMA)) composite obtained from in situ and MWI methods.

Figure 2:
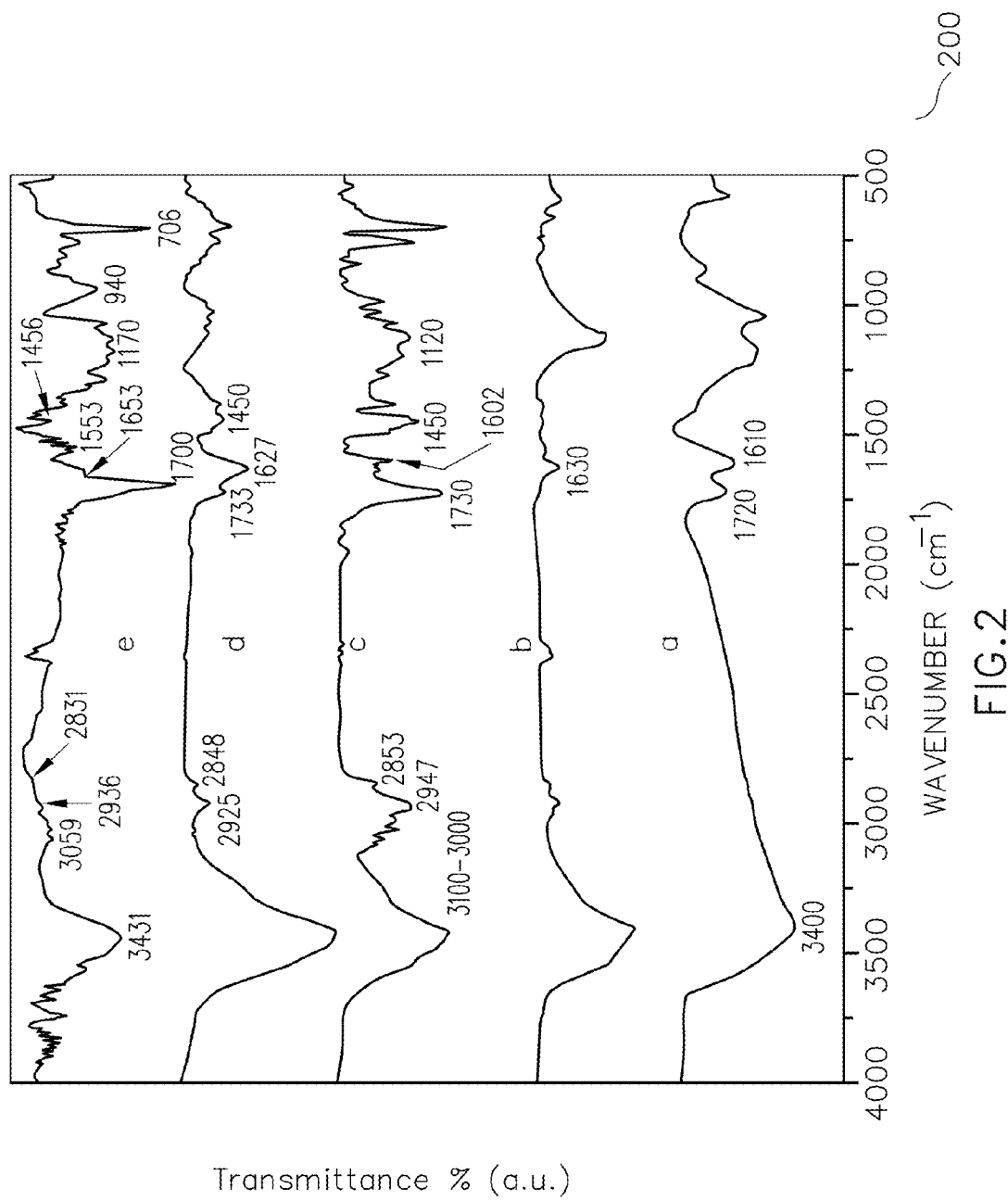

FTIR spectral analysis was performed to confirm the chemical structure of all copolymers. FIG. 2 shows the FTIR spectra of Graphene Oxide (GO), Graphene (GR), poly(STY-co-MMA), RGO-(STY-co-MMA) nanocomposite, and R-(GO-(STY-co-MMA)) nanocomposite. The characteristic FTIR features of GO (FIG. 2 line a) include the presence of different types of oxygen functionalities, which have been confirmed by the band at 3400 cm$^{-1}$, which corresponds with the O—H group, the bands at 1720 and 1610 cm$^{-1}$, which corresponds with the C═O carbonyl/carboxyl and C═C aromatic groups, respectively, and the band at 1220 cm$^{-1}$, which corresponds with the C—O in the epoxide group. For the reduced GR oxide (FIG. 2 line b) indicates that the O—H band at 3430 cm$^{-1}$ was reduced in intensity due to the deoxygenation of the GO-oxygenated functionalities. The spectrum of GR also contains bands at 1627 cm$^{-1}$ and 1139 cm$^{-1}$, which correspond to C═C and C—O groups, respectively. The FTIR spectrum of the prepared poly(STY-co-MMA) as shown in (FIG. 2 line c) exhibits several characteristic four peaks at 3000-3100 cm$^{-1}$ due to Ar—H and ═C—H stretching, 2947 and 2853 cm$^{-1}$ due to C—H stretching vibrations of methyl, methylene and methine groups, 1730 cm$^{-1}$ due to C═O stretching vibrations of ester carbonyl, 1602 cm$^{-1}$ due to aromatic C═C stretching vibrations, 1450-1390 cm$^{-1}$ due to C—H deformation bands, 1160-1120 cm$^{-1}$ due to C—O—C stretching vibrations. This is with agreement with the previously reported results for the neat copolymer [12]. (FIGS. 2 line d and 2 line e) also displays the FTIR spectra of RGO-(STY-co-MMA) and R-(GO-(STY-co-MMA)) composite. The resemblance of characteristic bands compared to the prepared neat poly(STY-co-MMA) indicates that there is no structural effect when MWI method was used to interrelate graphene into the poly(STY-co-MMA). The FTIR spectrum of RGO-(STY-co-MMA) composite (FIG. 2 line d) shows peaks at 3431 cm$^{-1}$ due to O—H stretching vibrations, 2925 and 2848 cm$^{-1}$ due to C—H stretching vibrations of methyl, methylene and methine groups, 1733 cm$^{-1}$ due to C═O stretching vibrations of ester carbonyl, 1627 cm$^{-1}$ due to aromatic C═C stretching vibrations, 1450-1383 cm$^{-1}$ due to C—H deformation bands, 1170-1114 cm$^{-1}$ due to C—O—C stretching vibrations. When MWI was employed in the preparation R-(GO-(STY-co-MMA)) composite (FIG. 2 line e), there was an increase in the intensity of the C═O bands and a decrease in the intensity of the C═C bands (at 1700 and 1653 cm$^{-1}$, respectively). In addition, the characteristic bands associated with aliphatic C—H and —CH$_2$ groups were observed at 2936 and 2831 cm$^{-1}$, respectively. Peaks at 3000-3100 cm$^{-1}$ due to Ar—H and ═C—H stretching. In the spectrum of the R-(GO-(STY-co-MMA)) composite compared with that obtained from the in situ method (FIG. 2*d*), there were some changes in intensity, shifts and emerging of some peaks in the regions of (C═O, C═C, Ar—H, ═C—H, and C—O—C), these evidences indicate intercalation between these groups and R-(GO-(STY-co-MMA)) composite using MWI method stronger than that of RGO-(STY-co-MMA) composite using in situ method. In summary, the results from FTIR spectroscopy suggest that all of the nanocomposite exhibit the characteristic peaks for poly(STY-co-MMA) chains and GR sheets.

Figure 3A:
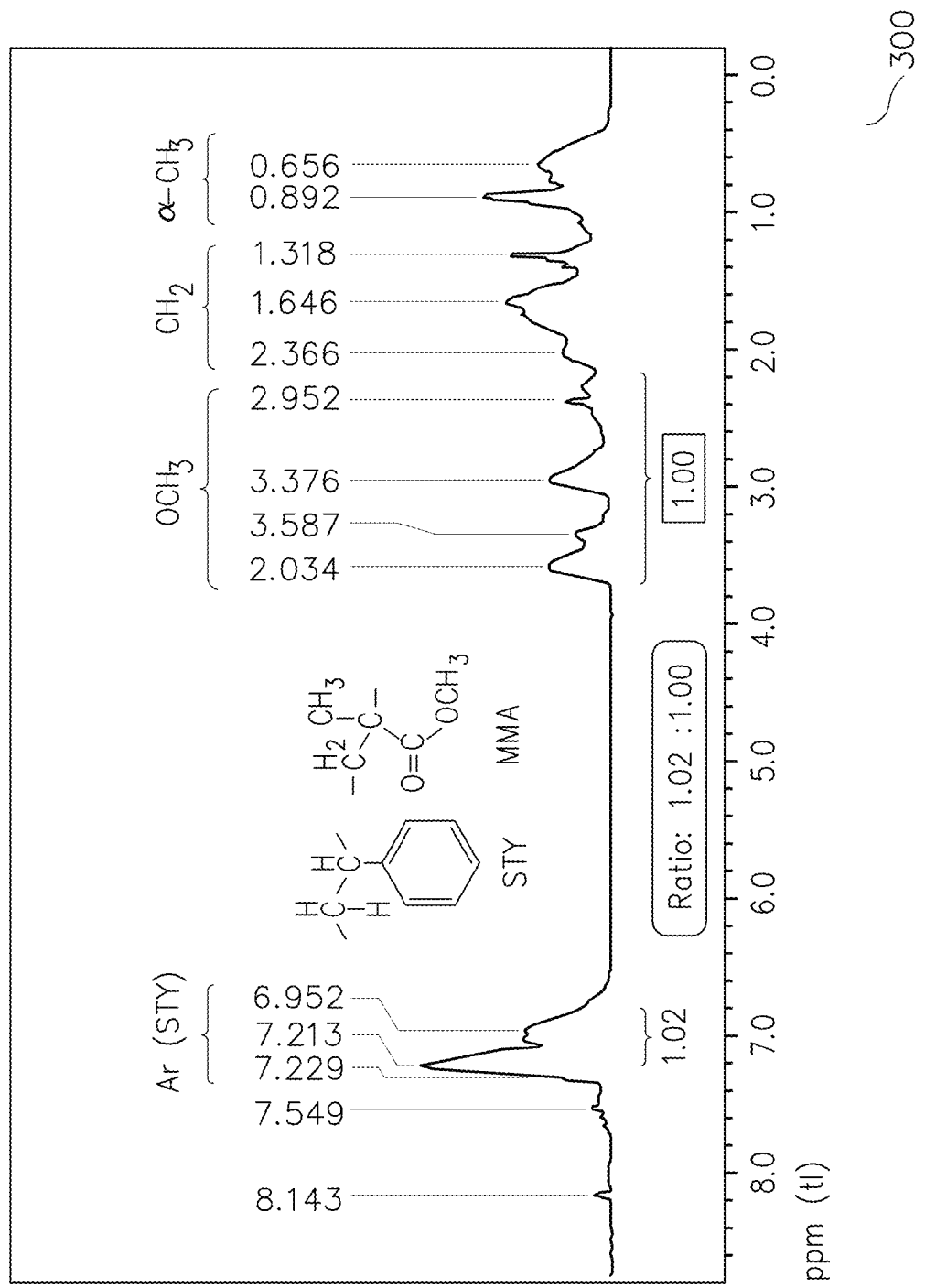
Figure 3B:
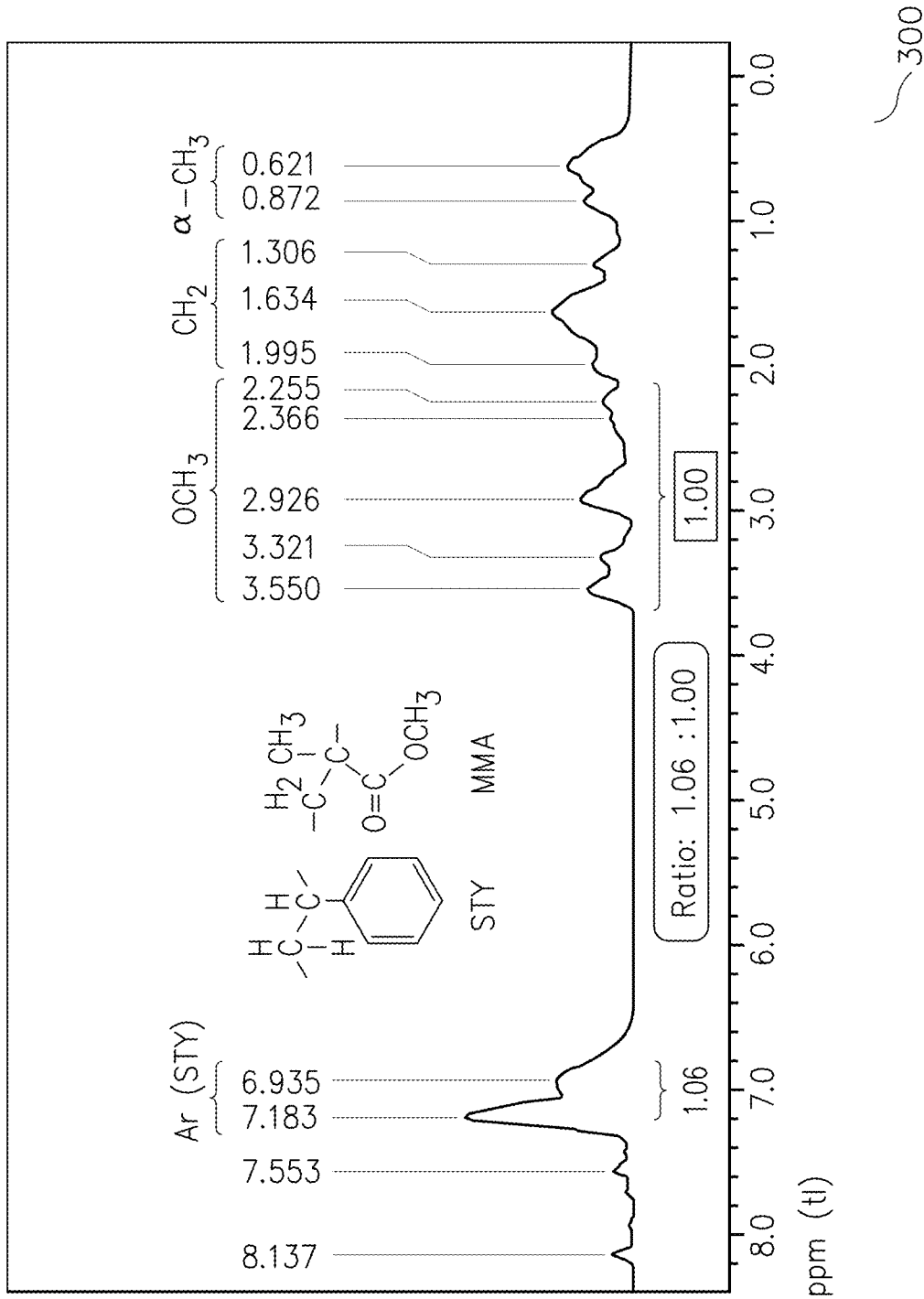
Figure 3C:
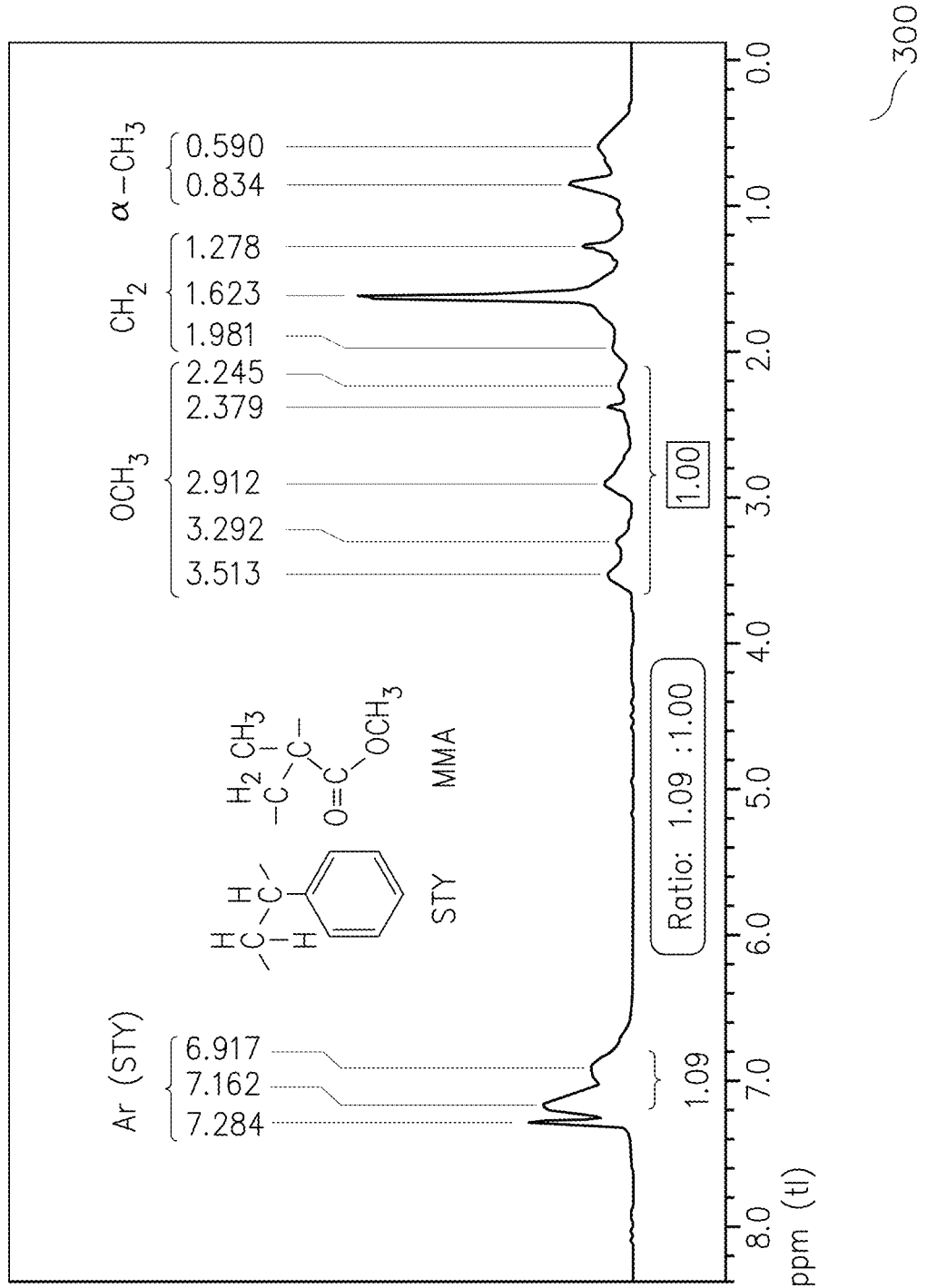

Another structural-evidence can be obtained from $^1$H-NMR and $^{13}$C-NMR. FIGS. 3A, 3B and 3C display $^1$H-NMR spectra of neat poly(STY-co-MMA), RGO-(STY-co-MMA) and R-(GO-(STY-co-MMA)) composite. The peaks at δ=~0.6-1.0 ppm represented —CH$_3$ (for MMA unit) and those between δ=~1.3 and 2 ppm corresponded to —CH$_2$ (for both MMA and STY units) and —CH (for STY unit). It was reported that STY shows a peak at δ=7.1 ppm and MMA at δ=2.8-3.6 ppm corresponding to the phenyl ring (—C$_6$H$_5$) and the methoxy ester linkage (—COOCH$_3$), respectively. These peaks were identified in all copolymers. The relative peak areas due to phenyl and methoxy protons have been used to calculate copolymer composition. The composition of all composite is very close to the amounts of STY/MMA (0.96 mol %) in monomers feed.

Figure 4A:
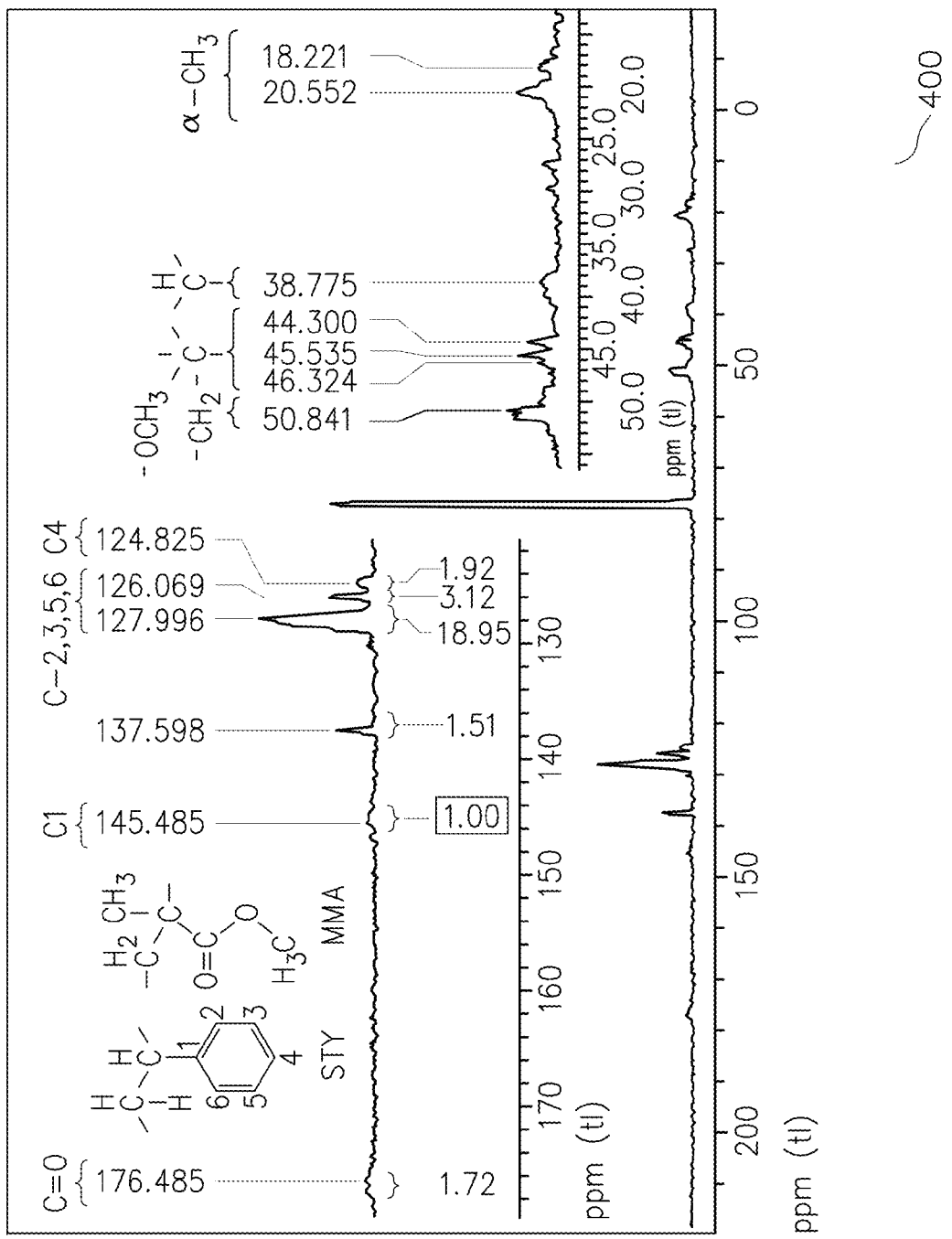
Figure 4B:
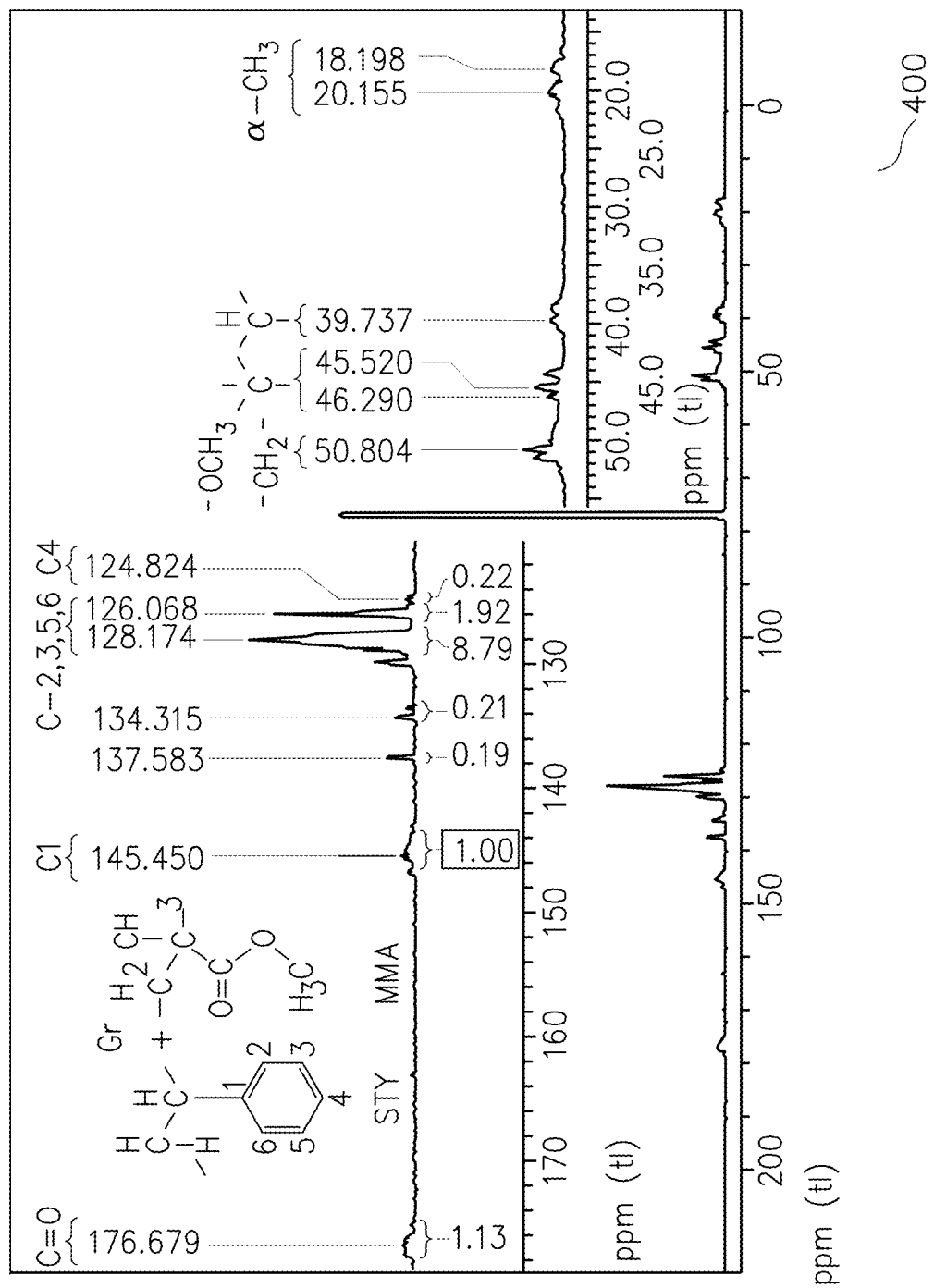
Figure 4C:
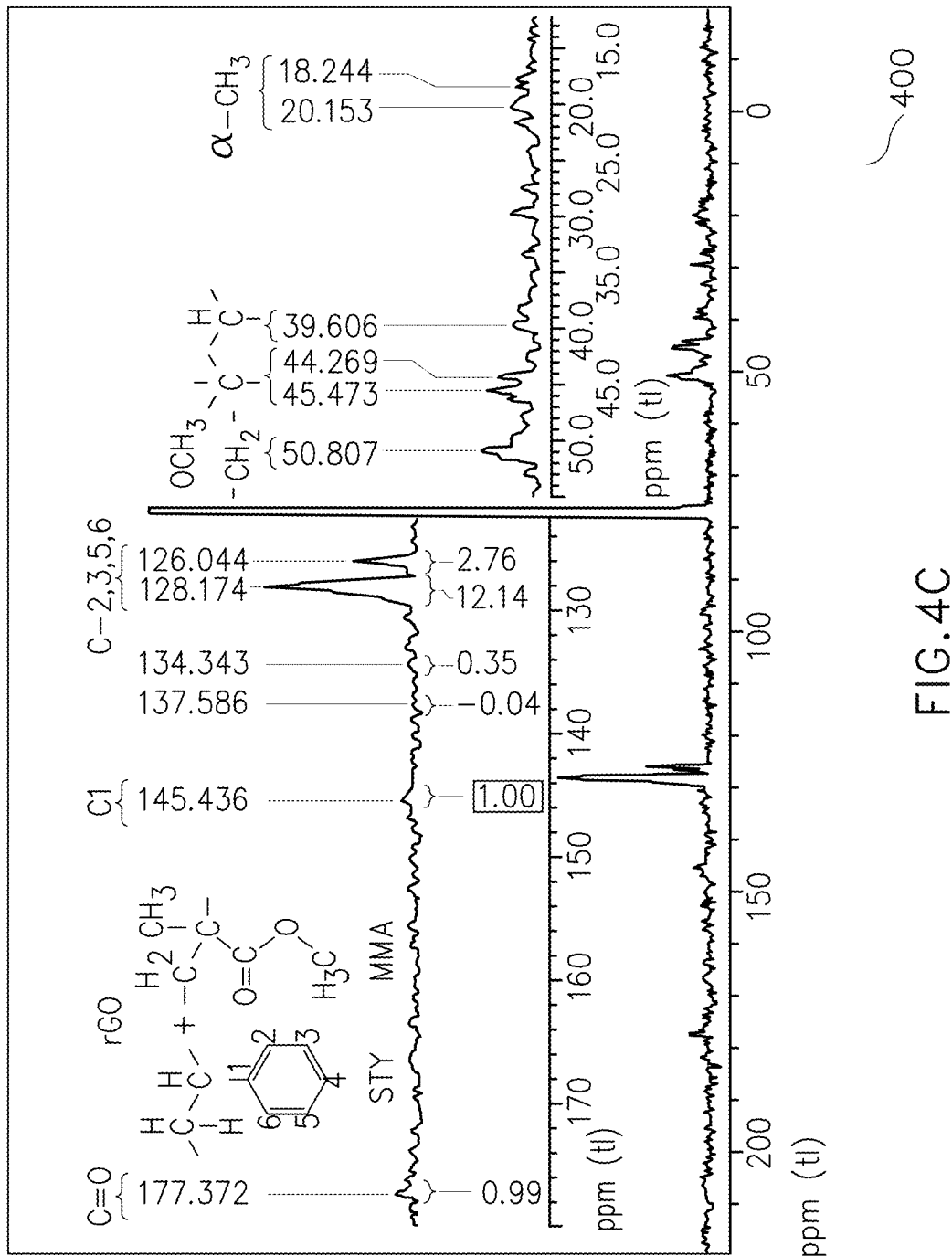

The $^{13}$C-NMR spectra of neat poly(STY-co-MMA), RGO-(STY-co-MMA) composite, and R-(GO-(STY-co-MMA)) composite are shown in (FIG. 4A). The corresponding chemical shifts band at around 128 ppm has been observed in the sample of poly(STY-co-MMA), RGO-(STY-co-MMA) and R-(GO-(STY-co-MMA)) composite and it has been assigned to carbon-carbon bonds in condensed aromatic structures. The $^{13}$C spectra of RGO-(STY-co-MMA) and R-(GO-(STY-co-MMA)) composite also show essentially complete elimination of all epoxides (60 ppm region), almost as large a decrease in the alcohol content (70 ppm region) and the apparent elimination of any esters (again, much less intensity near 167 ppm). Peak around 176 ppm related to the carbon from aromatic carboxylic acids; (FIG. 4B) also indicated C═C bonds in the 126 ppm region, as well as the existence of carbonyl groups in the final product. The resonance at ~134 ppm belongs to the un-oxidized sp$^2$ carbons of the graphene network. This signal for graphitic sp$^2$ carbon dominates both the RGO-(STY-co-MMA) and R-(GO-(STY-co-MMA)) composite spectra (FIGS. 4A, 4C). This corresponds well with $^1$H-NMR findings.

Figure 5:
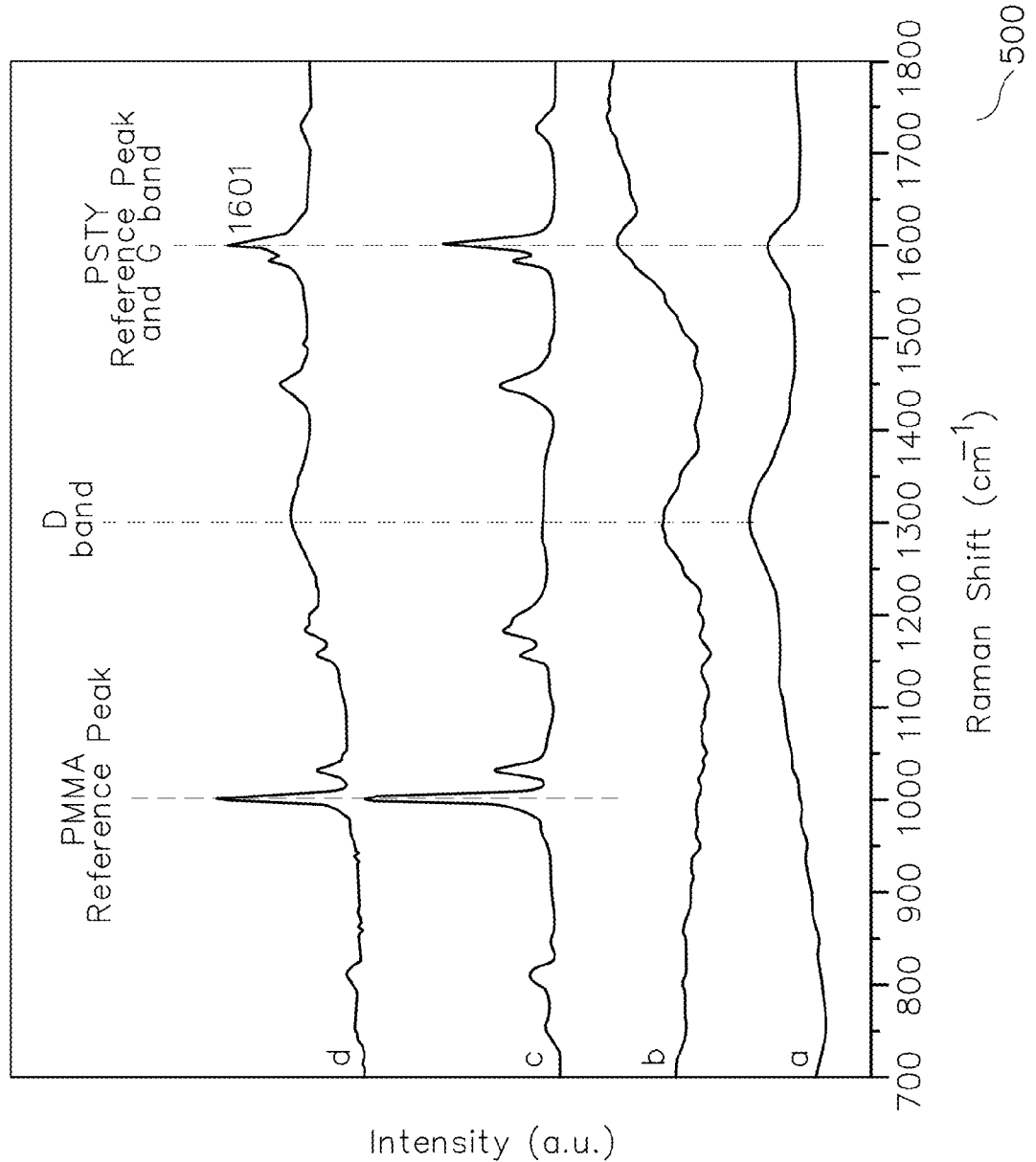

The composition of copolymer and copolymers composite were further studied by Raman spectroscopy (FIG. 5). The major scattering peaks of MMA and STY were observed. The observed peaks at 1448 cm$^{-1}$ and 1600 cm$^{-1}$ have been assigned to the CH$_3$ and C═C aromatic groups of MMA and STY, respectively. Comparison of the intensity of D band at 1300 cm$^{-1}$ and G band at 1600 cm$^{-1}$ (a well-accepted method for estimating the quality and structural order of graphitic structures [15]. RGO-(STY-co-MMA) and R-(GO-(STY-co-MMA)) composite show that there is no significant difference in terms of influence defects in the structure of composite. The D band is related to the sp$^3$ states of carbon, and it is used as a proof a disruption of the aromatic π-electrons system of graphene. The ratio of the intensities of the two bands (D/G), which should increase as a result of the interaction between π network in GR and C—OCH$_3$ and C═O in MMA and C═C in STY. The (D/G) band ratio for the GR is 0.66, where the ratio of RGO-(STY-co-MMA) composite is 0.77 (Table 2). This result indicates that the sp$^2$-hybridized carbons were converted to sp$^3$ hybridized carbons, which may be due to the covalent attachment of the GR sheets to the polymer. The ratio was the highest for the R-(GO-(STY-co-MMA)) composite, indicating a stronger covalent interaction than in the RGO-(STY-co-MMA) composite, which was prepared via in situ bulk polymerization.

Table 1.

Summary of the D/G Ratio Determined from the Raman Spectroscopy

| Sample | D band 1300 | G band 1600 | D/G ratio |
|---|---|---|---|
| GO | 0.052 | 0.036 | 1.44 |
| GR | 0.016 | 0.025 | 0.64 |
| Poly(STY-co-PMMA) | — | — | — |
| RGO-(STY-co-MMA) | 0.521 | 0.678 | 0.77 |
| R-(GO-(STY-co-MMA)) | — | — | — |

Figure 6:
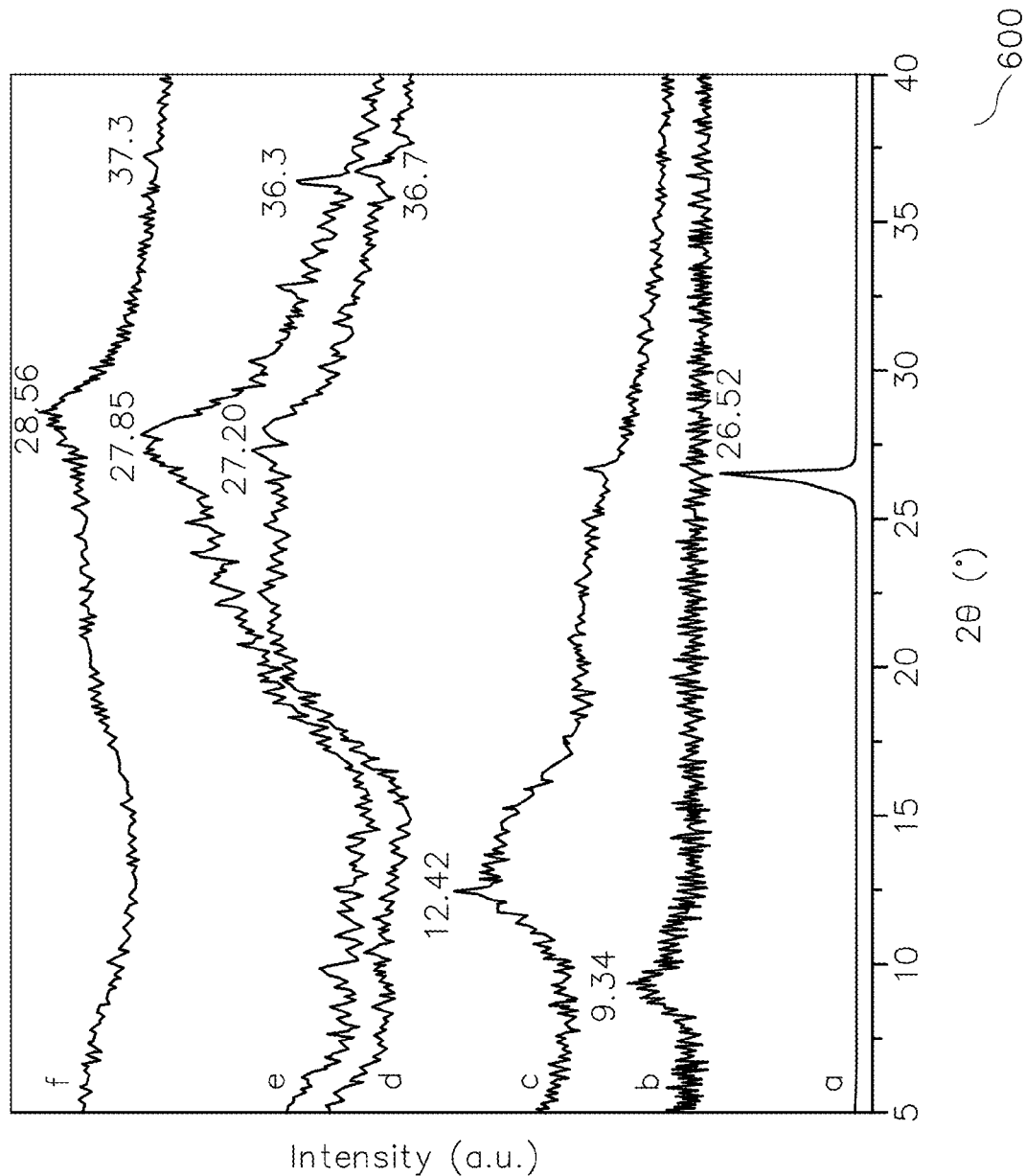

The presence, intercalation and/or exfoliation and dispersion of GR sheets in the polymer matrix can be evaluated using XRD. The XRD pattern of the graphite displayed in (FIG. 6*a*) showed a strong characteristic peak at 2θ=26.54°, with a d-spacing of 0.34 nm. The XRD pattern of GO displayed in (FIG. 6b) showed a characteristic peak (2θ) at approximately 9.34°, which corresponds with a d-spacing of 0.95 nm. After GO was reduced by HH (FIG. 6c), the d-spacing decreased. In addition, the peak appeared at 2θ=12.42°, with a d-spacing of 0.71 nm. This result confirms the chemical reduction of GO and formation of GR via the HH reducing agent. In addition, this result also indicates the removal of large number of oxygen-containing groups and the formation of much more exfoliated GR sheets, as well as a change in the hybridization of the reduced carbon atoms from tetrahedral $sp^3$ to planar $sp^2$. The characteristic diffraction peak of the poly (STY-co-MMA) (FIG. 6d) indicated an amorphous structure with 2θ=27.20° with a d-spacing of 0.328 nm. After loading GR to the co-polymer matrix, the RGO-(STY-co-MMA) composite resulted in 2θ=27.85° with a d-spacing of 0.321 nm. Finally, R-(GO-(STY-co-MMA)) composite showed a decrease in the d-spacing which appeared at 2θ=28.56° with a d-spacing of 0.313 nm. Only one broad diffraction peak relating to the diffraction peak of the poly (STY-co-MMA) in the composite (FIGS. 6d, 6e and 6f) was observed indicating an amorphous structure. Using MWI method, the XRD pattern of R-(GO-(STY-co-MMA)) composite had less d-spacing than RGO-(STY-co-MMA) composite, suggesting more stacking in the layers and indicating reduced attractive interactions among graphene-(STY/MMA) co-polymer matrix, making their exfoliation into individual sheets possible. A similar trend of changes in d-spacing can be observed for the peaks at 2θ=36.7° where the 2θ value decreased for RGO-(STY-co-MMA) composite and increased for R-(GO-(STY-co-MMA)). The relative level of crystallinity was higher for the R-(GO-(STY-co-MMA)) composite as the peak width (e.g. at 2θ=28.56°) decreased in comparison for the same peak for RGO-(STY-co-MMA) at 2θ=27.85°, indicating agglomeration in these (i.e., RGO-(STY-co-MMA) composite. This agglomeration may arise from strong van der Waals interactions between the reduced GR sheets. Similarly, both composite polymers indicate sharper peak in comparison to the poly (STY-co-MMA) e.g. at 2θ=27.20°. Moreover, the absence of the characteristic peaks of GO and GR in the composite indicate that the graphene platelets in GR have been exfoliated.

Figure 7:
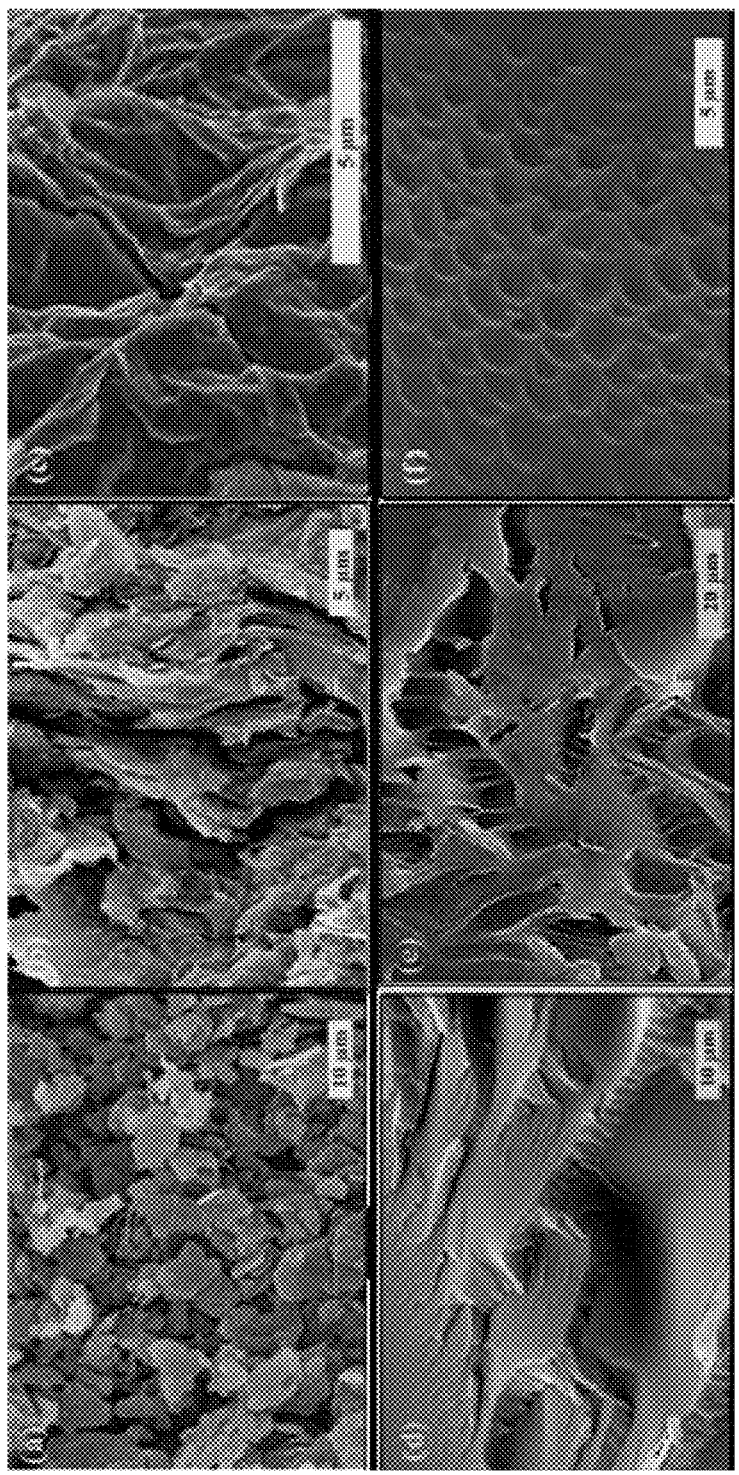

Direct evidence of exfoliation of the graphene in the final polymer composite can be obtained from SEM and HR-TEM; also it provides images of dispersion of graphene layers in neat (STY/MMA) copolymer matrix. FIG. 7a shows the SEM image of the graphite. The particles have a plate-like shape with average sizes of 1-10 μm. The prepared GO (FIG. 7b) were not fully exfoliated and had a flaky texture. This result suggests a partially exfoliated structure and reflects its layered microstructure containing large interlayer spacing and thick multilayer stacks, which is in agreement with the literature. FIG. 7c shows the SEM image of GR, which reveals that the GR consisted of randomly aggregated, thin, crumpled sheets that are closely associated with each other, forming a disordered solid. The SEM of neat poly (STY-co-MMA) (FIG. 7d) reveals existence common stacks of lamellae structure. RGO-(STY-co-MMA) image (FIG. 7e) shows very uneven terrain as well as the edge displaying protrusions. R-(GO-(STY-co-MMA)) (FIG. 7f) shows well established parallel-oriented lamellar structure. A comparison of the micrographs in FIG. 7e and FIG. 7f, the morphology is clearly different than that of the neat co-polymer (FIG. 7d), with a visible 'web-like' network between the edges of the copolymer.

Figure 8:
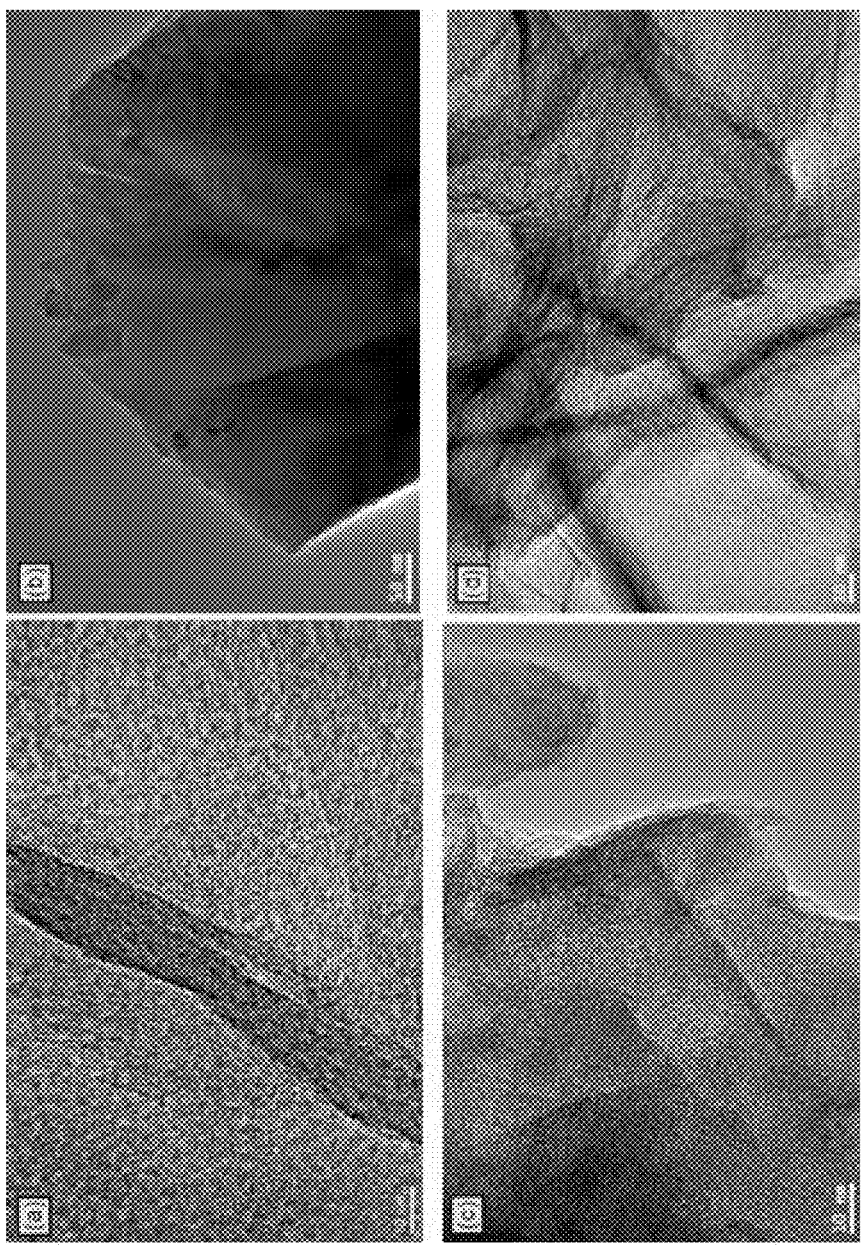

Because SEM cannot spatially resolve the thickness of an individual GR-based sheet, high resolution transmission electron microscopy (HR-TEM) was employed to determine if the GR-based sheets were indeed present in the composite as single exfoliated sheets or as multi-layered sheets. HR-TEM offers direct evidence for the formation of the GR nanosheets on the polymer composite. HR-TEM of GR, neat poly(STY-co-MMA), RGO-(STY-co-MMA) and R-(GO-(STY-co-MMA)) composite are shown in (FIG. 8). The graphene (GR) (FIG. 8a) shows clearly visible structure of the individual layers. FIG. 8b shows the HR-TEM image of neat poly(STY-co-MMA), showing a uniform gray level with different stack lamellae, indicating a miscible copolymer matrix. RGO-(STY-co-MMA) composite (FIG. 8c) show dark regions of GR platelets not randomly dispersed within the copolymer matrix. The dark heterogeneous regions, which show that there exist thick layers composed of several GR platelets. The R-(GO-(STY-co-MMA)) HR-TEM image (FIG. 8d) shows dark regions and visible boundaries between the GR platelets and copolymer matrix, and the layers clearly maintain their common orientation. This shows that the GR sheets, whose transparency for electron beam is better compared to those of (FIG. 8c), are finely dispersed in the matrix of the (STY/MMA) co-polymer and are oriented to a specific direction; in addition, the channels in this sample are more diffused. These results indicate that delamination of the GR platelets were effectively induced by the copolymerization and were effectively reduced by MWI to yield exfoliated RGO-(STY-co-MMA) composite. These results also indicate that MWI can improve the dispersion of GR in the matrix.

Figure 9:
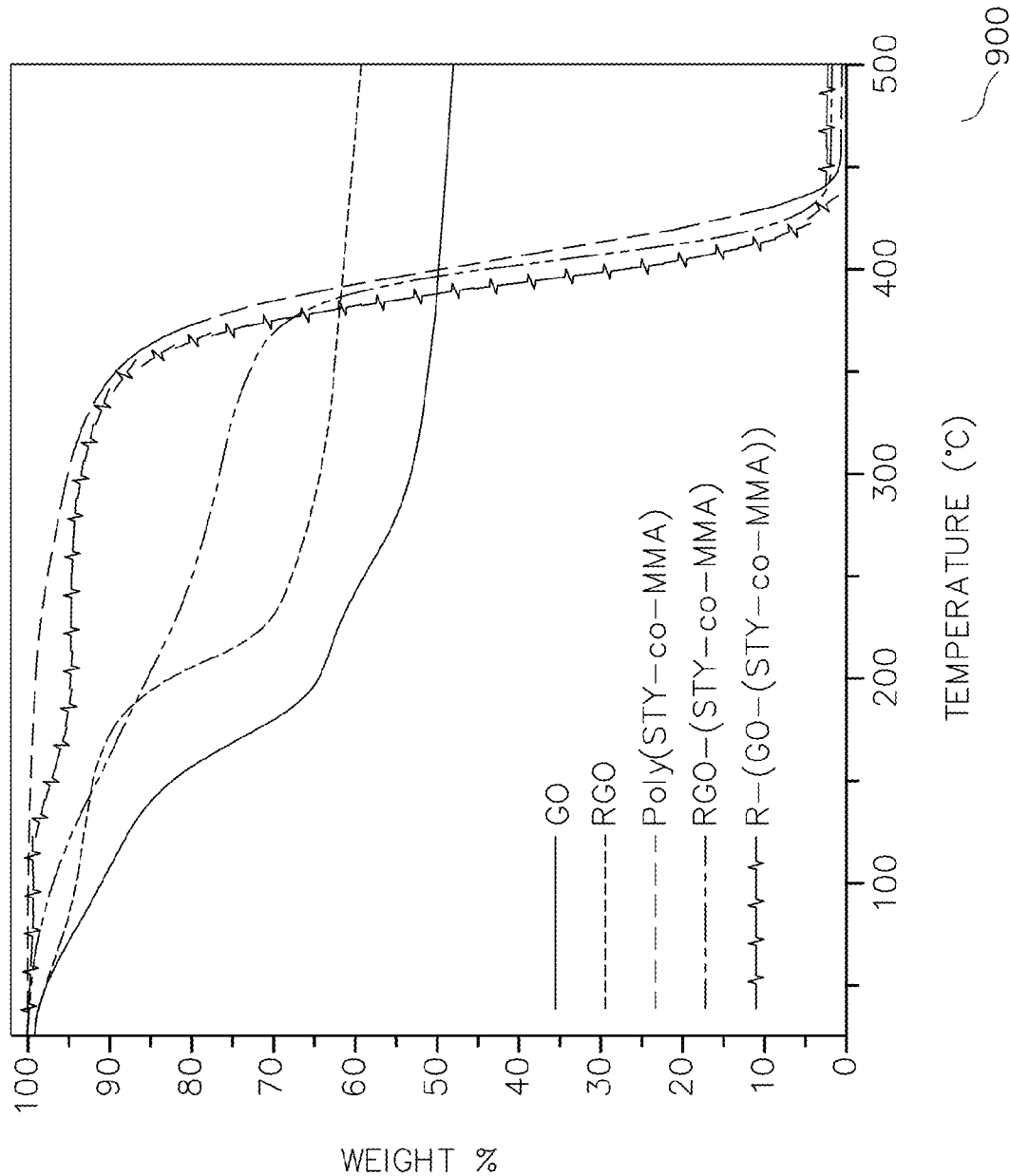

The thermo-gravimetric analysis (TGA) and differential scanning calorimetry (DSC) measurements were performed on co-polymer and co-polymer composite to examine the effect of the graphene content on the thermal stability. The TGA and DSC results of poly (STY-co-MMA), RGO-(STY-co-MMA) and R-(GO-(STY-co-MMA)) composite are displayed in FIG. 9 and summarized in Table 3. There is no significant weight loss of the neat poly (STY-co-MMA) below 400° C. The thermal degradation of neat poly (STY-co-MMA) only occurs in one step at 405° C. The TGA of RGO-(STY-co-MMA) composite follow three stage weight loss regions. The first weight loss was observed in the range 130-230° C. (~15%) which corresponds to the loss of graphene. The second weight loss from 230-390° C. (~10%) which corresponds to the loss of graphene. The main chain of RGO-(STY-co-MMA) composite (~70%) decomposes at 410° C. In the case of R-(GO-(STY-co-MMA)) composite, TGA thermogram shows more homogenous behavior with only (5%) weight loss on heating to 220° C. and the main chain decomposes at 393° C. (~90%). This clearly shows that R-(GO-(STY-co-MMA)) composite are more thermal stable relative to the RGO-(STY-co-MMA) composite prepared by in situ method. Moreover, R-(GO-(STY-co-MMA)) and RGO-(STY-co-MMA) the composite generally resulted in a slight decrease in the thermal stability of the composite related to the neat poly (STY-co-MMA).

Figure 10:
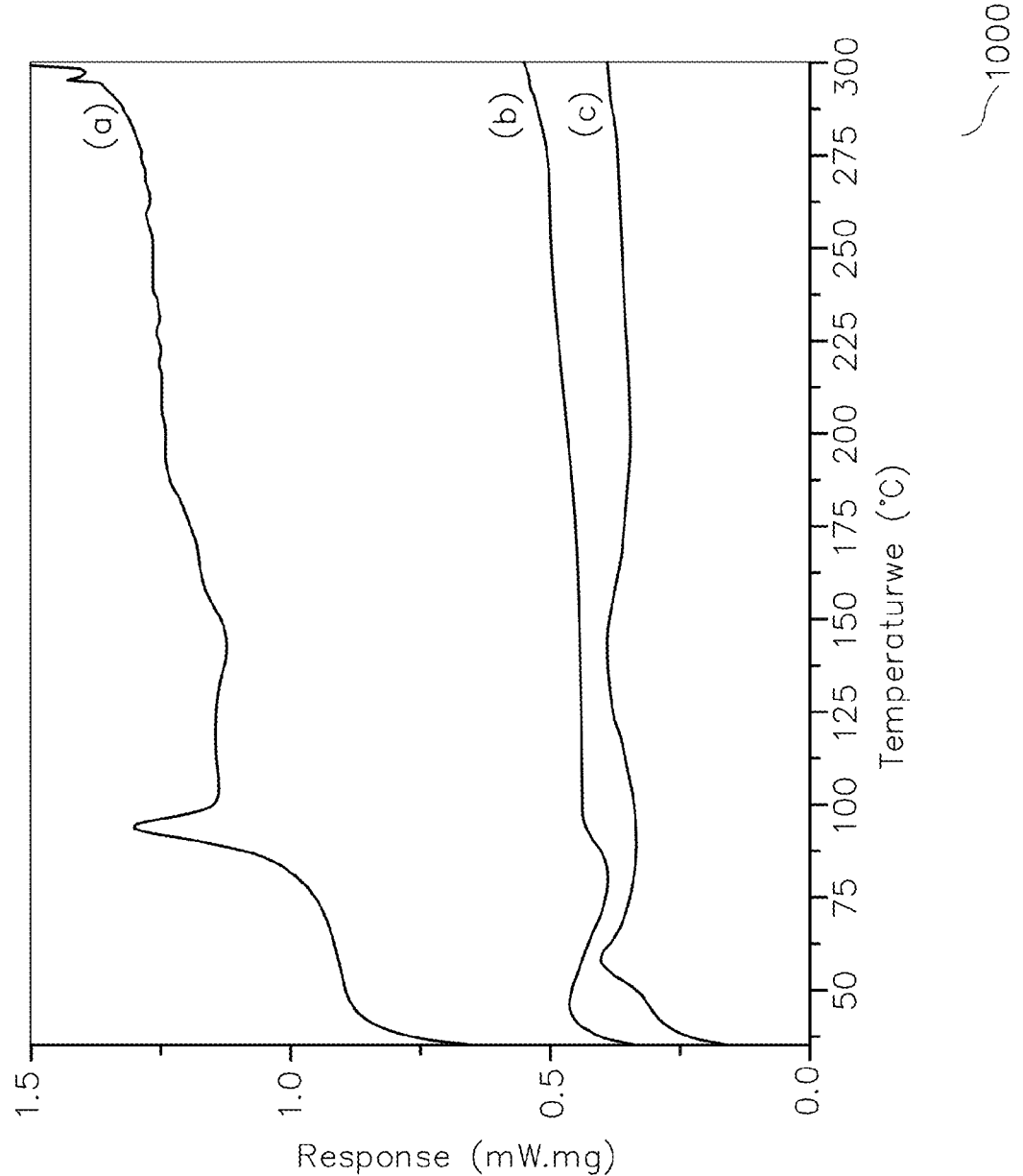
FIG. 10. DSC curves of (a) neat poly (STY-co-MMA), (b) RGO-(STY-co-MMA) nanocomposite, (c) R-(GO-(STY-co-MMA)) nanocomposite.

To further understand the thermal behavior and homogeneity of the composite prepared by the two different methods, differential scanning calorimetry (DSC) of the neat poly (STY-co-MMA), RGO-(STY-co-MMA) and R-(GO-(STY-co-MMA)) composite was employed to compare the glass transition temperature ($T_g$) of the polymer itself with the composite. The DSC curves of all synthesized poly(STY-co-MMA) are shown in (FIG. 10) and the $T_g$ data are also summarized in Table 3. The $T_g$ values of neat poly(STY-co-MMA) was 93° C. The $T_g$ of RGO-(STY-co-MMA) nanocomposite was 89.5° C., while R-(GO-(STY-co-MMA)) composite show $T_g$ of 119° C. Interestingly the glass transition temperature ($T_g$) of R-(GO-(STY-co-MMA)) composite ($T_g=119°$ C.) is higher than the $T_g$ of the poly (STY-co-MMA), ($T_g=93°$ C.). This indicates that our approach, to intercalate the graphene into poly (STY-co-MMA) using MWI method, clearly enhance the thermal properties of the copolymer. This $T_g$ shift has been attributed to the presence of so called 'interphase' polymer networking, which arises due to the interaction of the chains with the graphene platelet surface, which may restricted the mobility, creating an enormous volume of matrix polymer with increased $T_g$. Percolation of this network of interphase polymer could then manifest the large $T_g$ shift of the copolymer composite.

Table 2.
Summary of Thermal Behavior Data Obtained from TGA and DSC Measurements

| Sample | $T_{degradation}$ (° C.) | $T_g$ (° C.) |
|---|---|---|
| GO | 160 | — |
| GR | 210 | — |
| PSTY | 412 | 88.5 |
| PMMA | 290, 380 | 117.0 |
| Poly(STY-co-MMA) | 405 | 93.0 |
| RGO-(STY-co-MMA) | 190, 255, 407 | 89.5 |
| R-(GO-(STY-co-MMA)) | 393 | 119.0 |

The instant experiment proves that RGO-(STY-co-MMA) and R-(GO-(STY-co-MMA)) using in situ bulk polymerization facilitated by MWI was successfully prepared. Thermal analysis showed an enhancement in the thermal properties of the R-(GO-(STY-co-MMA)) nanocomposite prepared using MWI, which indicates that the RGO sheets efficiently reinforced the (STY-co-MMA)) matrix. Therefore, our approach is promising for the development of a new class of graphene-polymer nanocomposite. This investigation considered the relative changes in physical and thermal properties of composite in which GR was used as a nano-filler. The composite obtained using MWI exhibited a better morphology and increased dispersion with enhanced thermal stability. Therefore, our approach is promising for the development of a new class of graphene-polymer composite. In this disclosure composite and nanocomposite are used interchangeably.

In addition, it will be appreciated that the various composition of the nanocomposite and method of making the nanocomposite disclosed herein may be embodied using means for achieving the various combinations of material and irradiation doses using microwave. Accordingly, the specification and drawings are to be regarded in an illustrative rather than a restrictive sense.

What is claimed is:

1. A method of making a nanocomposite, comprising:
   adding sulphuric acid solution to a natural graphite to oxidize the natural graphite to create a solution 1;
   adding potassium permanganate to the solution 1 to make solution 2 and maintaining the temperature of solution 2 below 20° C.;
   stirring the solution 2 for 1 hour at 35° C.;
   washing the solution 2 with a hydrogen peroxide and water;
   filtering the solution 2 to isolate a graphene oxide;
   drying the graphene oxide at 80° C. to obtain a dry powder of graphene oxide; and
   mixing the powder of graphene oxide in a specific ratio with a styrene and methyl methacrylate mixture, and stirring and sonicating for an hour to make a suspension, wherein the weight ratio between styrene and methyl methacrylate is 1:1.

2. The method of claim 1, further comprising:
   adding a benzoyl peroxide initiator to the suspension to create a reaction mixture;
   shaking the reaction mixture in a shaking water bath at 60° C. for 20 hours for polymerization to obtain a polymerized product;
   washing the polymerized product with methanol for 15 minutes; and
   filtering the polymerized washed product and drying the filtered product at 80° C. overnight.

3. The method of claim 2, further comprising:
   adding 400 µl of a hydrazine hydrate to 400 mg of the filtered product to microwave in 30 second cycles, wherein the 30 s cycle was on for 10 s and off and stirring for 20 s; and
   centrifuging the microwaved product for 15 minutes at 5000 rpm to obtain a nanocomposite.

4. The method of claim 3, wherein the nanocomposite is a poly(styrene-co-methyl methacrylate) and graphene nanocomposite.

5. A method of making a nanocomposite comprising:
   adding sulphuric acid solution to a natural graphite to oxidize the natural graphite to create a solution 1;
   adding potassium permanganate to the solution 1 to make solution 2 and maintaining the temperature of solution 2 below 20° C.;
   stirring the solution 2 for 1 hour at 35° C.;
   washing the solution 2 with a hydrogen peroxide and water;
   filtering the solution 2 to isolate a graphene oxide;
   drying the graphene oxide at 80° C. to obtain a dry powder of graphene oxide;
   dissolving the dry power of graphene oxide in 20 ml of deionized water to make a homogeneous solution;
   adding 400 microliter of a hydrazine hydrate reducing agent to create a mixture;
   microwaving the mixture in 30 second cycles, wherein the 30 s cycle was on for 10 s and off and stirring for 20 s, for a total of two minutes to obtain a black color liquid comprising reduced graphene oxide; and
   separating the reduced graphene oxide using centrifugation and drying at 80° C. overnight to obtain a reduced graphene oxide powder.

6. The method of claim 5, further comprising:
   mixing the powder of reduced graphene oxide in a specific ratio with a styrene and methyl methacrylate mixture, and stirring and sonicating for an hour to make a suspension, wherein the weight ratio between styrene and methyl methacrylate is 1:1;
   adding a benzoyl peroxide initiator to the suspension to create a reaction mixture;
   shaking the reaction mixture in a shaking water bath at 60° C. for 20 hours for polymerization to obtain a polymerized product;
   washing the polymerized product with methanol for 15 minutes; and
   filtering the polymerized washed product and drying the filtered product at 80° C. overnight.

7. The method of claim 6, wherein the nanocomposite is a poly(styrene-co-methyl methacrylate) and reduced graphene oxide nanocomposite.

8. A method of making a nanocomposite, comprising:

adding sulphuric acid solution to a natural graphite to oxidize the natural graphite to create a solution 1, wherein 3.5 g of the natural graphite was used;

adding potassium permanganate to the solution 1 to make solution 2 and maintaining the temperature of solution 2 below 20° C.;

stirring the solution 2 for 1 hour at 35° C.;

washing the solution 2 with a hydrogen peroxide and water;

filtering the solution 2 to isolate a graphene oxide; and drying the graphene oxide at 80° C. to obtain a dry powder of graphene oxide.

9. The method of claim 8, further comprising:

mixing the powder of graphene oxide in a specific ratio with a styrene and methyl methacrylate mixture, and stirring and sonicating for an hour to make a suspension, wherein the weight ratio between styrene and methyl methacrylate is 1:1;

adding a benzoyl peroxide initiator to the suspension to create a reaction mixture;

shaking the reaction mixture in a shaking water bath at 60° C. for 20 hours for polymerization to obtain a polymerized product;

washing the polymerized product with methanol for 15 minutes; and filtering the polymerized washed product and drying the filtered product at 80° C. overnight;

adding 400 µl of a reducing agent to 400 mg of filtered product to microwave in 30 second cycles, wherein the 30 s cycle was on for 10 s and off and stirring for 20 s; and centrifuging the microwaved product for 15 minutes at 5000 rpm to obtain a nanocomposite.

10. The method of claim 9, wherein the nanocomposite is a poly(styrene-co-methyl methacrylate) and graphene nanocomposite.

11. The method of claim 9, wherein the reducing agent is hydrazine hydrate.

* * * * *